US005114611A

United States Patent [19]

Van Kralingen et al.

[11] Patent Number: 5,114,611

[45] Date of Patent: May 19, 1992

[54] BLEACH ACTIVATION

[75] Inventors: Cornelis G. Van Kralingen, Waverton, Great Britain; Rudolf J. Martens, Vlaardingen, Netherlands; Mark E. Rerek, Fanwood, N.J.; Ton Swarthoff, Hellevoetsluis; Marten Van Vliet, Haarlem, both of Netherlands

[73] Assignee: Lever Brothers Company, Divison of Conopco, Inc., New York, N.Y.

[21] Appl. No.: 507,075

[22] Filed: Apr. 9, 1990

[30] Foreign Application Priority Data

Apr. 13, 1989 [GB] United Kingdom ................. 8908416

[51] Int. Cl.[5] ................................ C01B 15/00

[52] U.S. Cl. .......................... 252/186.33; 252/186.26; 252/186.27; 252/186.28; 252/186.39; 252/95

[58] Field of Search ....................... 252/186.33, 186.39

[56] References Cited

U.S. PATENT DOCUMENTS

| | | | |
|---|---|---|---|
| 3,156,654 | 11/1964 | Konecny et al. | 259/95 |
| 3,532,634 | 10/1970 | Woods | 252/95 |
| 4,119,557 | 10/1978 | Postlethwaite | 252/99 |
| 4,427,490 | 1/1984 | Eckert | 252/186.33 |
| 4,430,243 | 2/1984 | Bragg | 252/186.33 |
| 4,728,455 | 3/1988 | Rerek | 252/99 |
| 4,810,410 | 3/1989 | Diakun et al. | 252/186.33 |
| 5,002,682 | 3/1991 | Bragg et al. | 252/186.33 |
| 5,021,187 | 6/1991 | Harriott et al. | 252/186.39 |

FOREIGN PATENT DOCUMENTS

| | | |
|---|---|---|
| 0124341 | 11/1984 | European Pat. Off. . |
| 0272030 | 6/1988 | European Pat. Off. . |
| 2054019 | 10/1971 | Fed. Rep. of Germany . |
| 3002271 | 7/1981 | Fed. Rep. of Germany . |
| 984459 | 2/1965 | United Kingdom . |
| 1192524 | 5/1970 | United Kingdom . |

OTHER PUBLICATIONS

J. C. Bailer and S. Kirschner, "Inorganic Synthesis" 1957, vol. 5, p. 184.

M. Goodgame, Journ. of Chem. Soc. (A), 1966, p. 63.

W. L. Johnson and J. F. Geldard, Inorganic Chemistry, 1978, vol. 17, No. 6, p. 1675.

*Primary Examiner*—Richard D. Lovering
*Assistant Examiner*—Joseph D. Anthony
*Attorney, Agent, or Firm*—Milton L. Honig

[57] ABSTRACT

Peroxy compound bleaching is activated by a catalytic amount of a transition metal complex of a transition metal (Mn, Co, Fe or Cu) with a non-(macro)-cyclic ligand of the formula:

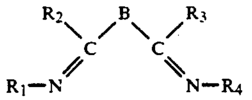

preferably 2,2'-bispyridylamine.

Bleaching agent and bleach detergent compositions are also disclosed comprising a peroxy compound bleach and said transition metal complex. The transition metal complex is an effective catalyst for activating hydrogen peroxide compounds, peroxyacids and peroxyacid bleach precursors on removing a wide class of stains from substrates, especially texiles and fabrics.

7 Claims, No Drawings

BLEACH ACTIVATION

FIELD OF THE INVENTION

This invention relates to activation of bleaches employing peroxy compounds, including hydrogen peroxide or a hydrogen peroxide adduct, which liberate hydrogen peroxide in aqueous solution, as well as peroxy acids; to compounds that activate or catalyse peroxy compounds; to bleach compositions including detergent bleach compositions which contain a catalyst for peroxy compounds; and to processes for bleaching and/or washing employing the aforementioned types of compositions.

In particular, the present invention is concerned with the effective use of heavy metal compounds as catalyst for the bleach activation of peroxy compound bleaches.

THE RELATED ART

Peroxide bleaching agents for use in laundering have been known for many years. Such agents are effective in removing stains, such as tea, fruit and wine stains, from clothing at or near boiling temperatures. The efficacy of peroxide bleaching agents drops off sharply at temperatures below 60° C.

It is known that many heavy metal ions catalyse the decomposition of $H_2O_2$ and $H_2O_2$-liberating percompounds, such as sodium perborate. It has also been suggested that heavy metal salts together with a chelating agent can be used to activate peroxide compounds so as to make them usable for satisfactory bleaching of substrates at lower temperatures. Not all combinations of heavy metals with chelating agents appeared to be suitable for improving the bleaching performance of peroxide compound bleaches. Many combinations indeed show no effect, or even a worsening effect, on the bleaching performance; no proper rule seems to exist by which the effect of metal ion/chelating agent combinations on the bleaching performance of peroxide compound bleaches can be predicted.

Various attempts have been made to select suitable metal/chelating agent combinations for said purpose and to correlate bleach-catalysing effect with some physical constants of the combination; so far without much success and of no practical value.

U.S. Pat. No. 3,156,654 suggested particularly cobalt and copper salts in conjunction with pyridine-2-carboxylic acid or pyridine-2,6-dicarboxylic acid, preferably as a pre-formed complex, as being a suitable combination. Another suggestion is made in U.S. Pat. No. 3,532,634 to use a transition metal, especially cobalt, manganese and copper salts, together with a chelating agent in combination with a persalt and an organic bleach activator. It is said here that the chelating agent should have a first complex formation constant with the transition metal ion of log 2 to about log 10 at 20° C. Preferred options include (di)-picolinic acid, pyrrolidine-carboxylic acids and 1,10-phenanthroline, whereas well-known chelating agents, such as ethylene diamine tetraacetic acid—found usable according to U.S. Pat. No. 3,156,654—are unsuitable. These catalysts, as shown in the Examples, have very little or no effect on persalts alone.

Other patent documents discussing the use of chelating agents are, for example, GB Patents 984,459 and 1,192,524, which suggested the use of copper salts in combination with other specific chelating agents of the class of amino acetic acids, and U.S. Pat. No. 4,119,557, which suggested the use of pre-formed ferric ion complexes with a polycarboxy amine-type chelating agent. All these prior art suggestions are based on systems in which free metal ion is the catalytically active species and consequently produce results in practice that are often very inconsistent and/or unsatisfactory, especially when used for washing at low temperatures. The ferric ion complexes of U.S. Pat. No. 4,119,557 are furthermore not effective at low temperatures.

For a heavy metal to be useful as a bleach catalyst in a detergent bleach composition, the heavy metal compound must not unduly promote peroxide decomposition by non-bleaching pathways and must be hydrolytically and oxidatively stable. U.S. Pat. No. 4,728,455 discusses the use of Mn(III)-gluconate as peroxide bleach catalyst and EP-A-0272030 discloses the use of cobalt(III)amine complexes, e.g. $[Co(NH_3)_5Cl]Cl_2$, as peroxide bleach catalysts. Each of these systems is limited to one specific metal. They are furthermore restricted in their efficacy to remove a wide class of stains.

It is an object of the present invention to provide an improved heavy metal catalyst for the bleach activation of hydrogen peroxide and hydrogen peroxide-liberating compounds, as well as peroxyacid compounds, including peroxyacid precursors, over a wide class of stains at lower temperatures.

Another object of the invention is to provide an improved bleaching agent composition for use in detergent formulations which are effective at low to medium temperatures of e.g. 20°-40° C.

Still another object of the invention is to provide new, improved detergent bleach formulations.

Yet another object of the invention is to provide aqueous laundry wash media containing new, improved detergent bleach formulations.

These and other objects of the invention, as well as further understandings of the features and advantages thereof, can be had from the following description and claims.

SUMMARY OF THE INVENTION

The improved heavy metal bleach catalyst compounds according to the invention are transition metal complexes of the following general formula:

$$[M_n(L)_mX_p]^zY_z \qquad (I)$$

wherein M is a metal ion selected from Mn, Fe, Co and Cu; X can be a common anion such as $Cl^-$, $Br^-$, $I^-$, $NO_3^-$, $ClO_4^-$, $NCS^-$ and $OH^-$, or a species selected from $O_2^{2-}$, $O_2^-$, $HO_2^-$, and $H_2O_2$; or a small coordinating ligand such as $H_2O$, $NH_3$ and pyridine;

n represents an integer from 1 to 2;

m is an integer from 1-5;

p is an integer from 0-8;

Y is a counter ion, the type of which is dependent upon the charge z of the complex;

z denotes the charge of the complex and is an integer which can be positive or negative, whereby, if z is positive, Y is a common anion as denoted for X and, if z is negative, Y is a common cation selected from alkali metal, alkaline earth metal or an alkyl ammonium cation; and L is a ligand being an organic compound having the general formula:

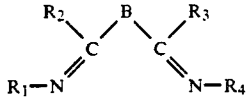

(II)

in which $R_1$, $R_2$, $R_3$ and $R_4$ can each be selected from H, optionally substituted alkyl and aryl groups, and such substituents in which each $R_1—N=C—R_2$ and $R_3—C=N—R_4$ form a five- or six-membered, optionally substituted, nitrogen-containing heterocylic ring system; and B is a bridging group selected from 0, S, $CR_5R_6$, $NR_7$ and C=O, wherein $R_5$, $R_6$ and $R_7$ can each be H, alkyl or aryl groups which may optionally be substituted. Examples of optional substituents are halogen, OH, $NO_2$, $NH_2$, $SO_3^-$, $OCH_3$, $N^+(CH_3)_3$.

The ligands as contemplated herein are thus non-(macro) cyclic compounds.

Typical five- or six-membered ring systems forming the ligand are, for example, pyridine, pyridazine, pyrimidine, pyrazine, imidazole, pyrazole and triazole rings which can optionally contain the usual types of substituents, such as alkyl, aryl, alkoxy, halide and nitro. The two rings may be identical or different, preferably identical.

Especially preferred ligands are those in which both rings are pyridine, preferably having NH as the bridging group B.

Accordingly, a particularly preferred ligand is 2,2'-bispyridylamine (BPA).

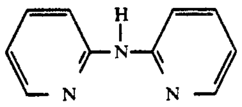

(III)

Where n=1, m can be 1-3 and p=0-4; and wherein n=2, m can be 2-5 and p=0-8.

It should be appreciated that in systems wherein m is 2 or more, the compound may contain different ligands from within the class of ligands described above.

Some typical examples of the preferred bleach catalysts usable in the invention are:

i)

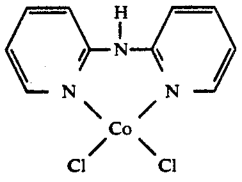

Co$^{(II)}$(BPA)Cl$_2$ which in the further description will be written in simplified form as:

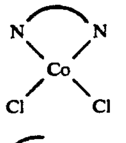

ii)

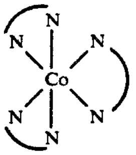

Co$^{(II)}$(BPA)$_3^{2+}$.

-continued iii)

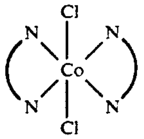

Co$^{(II)}$(BPA)$_2$Cl$_2$ iv)

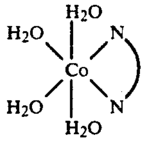

Co$^{(II)}$(BPA)(H$_2$O)$_4^{2+}$ v)

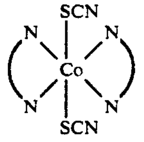

Co$^{(II)}$(BPA)$_2$(SCN)$_2$ (vi)

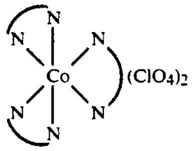

Co$^{II}$(BPA)$_3$(CLO$_4$)$_2$ vii)

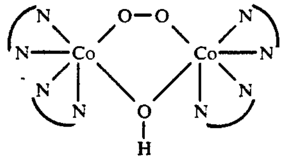

Co$_2$ $^{II}$(BPA)$_4$OH(O$_2$)

(viii)

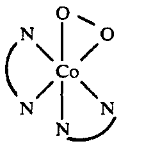

Co$^{(III)}$(BPA)$_2$O$_2$ (ix)

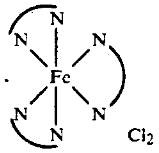

Fe$^{II}$(BPA)$_3$Cl$_2$ (x)

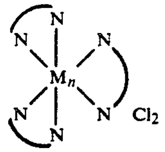

M$_n$$^{II}$(BPA)$_3$Cl$_2$

DETAILED DESCRIPTION

An advantage of the bleach catalyst of the invention is that they are hydrolytically and oxidatively stable, and that the complexes themselves are catalytically active, insensitive to builder variations in the composition. Another advantage is that the instant catalysts appear to be better than similar complexes proposed in the art. The instant bleach catalysts have furthermore the surprising feature in that they activate not only hydrogen peroxide or hydrogen peroxide-liberating compounds but also peroxyacids and peroxyacid bleach systems, such as a persalt/peroxyacid precursor mixture.

A further surprising feature of the bleach systems according to the invention is that they are effective on a wide range of stains including both hydrophilic and hydrophobic stains, which is very unusual for hydrogen peroxide-based bleach systems.

Accordingly, in one aspect, the invention provides a process for bleaching and cleaning of substrates employing a bleaching agent selected from the group of peroxy compound bleaches including hydrogen peroxide, hydrogen peroxide-liberating compounds, peroxyacids and their salts, and peroxyacid bleach precursors and mixtures thereof, which process is characterized in that said bleaching agent is activated by a catalytic amount of a transition metal complex of general formula (I) as defined hereinbefore.

The catalytic component is a novel feature of the invention. The effective level of the transition metal complex catalyst, expressed in terms of parts per million (ppm) of transition metal in the aqueous bleaching solution, will normally range from 0.01 ppm to 100 ppm, preferably from 0.1 ppm to 10 ppm.

In another aspect, the invention provides an improved bleaching agent composition comprising a peroxy compound bleach as defined above and a catalyst for the bleaching action of the peroxy compound bleach, said catalyst comprising the aforesaid transition metal complex of general formula (I). As indicated above, the improved bleaching agent composition has particular application in detergent formulations to form a new and improved detergent bleach composition within the purview of the invention, comprising said peroxy compound bleach, the aforesaid transition metal complex catalyst, a surface-active material, and usually also detergency builders and other known ingredients of such formulations.

The term "substrates" is used herein in the broad meaning of the word, including textiles and fabrics, which are preferred.

Compositions comprising a peroxy compound bleach and the aforesaid bleach catalyst are effective over a wide pH range of between 7 and 13, with optimal pH range lying between 8 and 11.

The peroxy compound bleaches which can be utilized in the present invention include hydrogen peroxide, hydrogen peroxide-liberating compounds, peroxyacids and their salts, and peroxyacid bleach precursors and mixtures thereof.

Hydrogen peroxide sources are well known in the art. They include the alkali metal peroxides, organic peroxide bleaching compounds such as urea peroxide, and inorganic persalt bleaching compounds, such as the alkali metal perborates, percarbonates, perphosphates and persulphates. Mixtures of two or more such compounds may also be suitable. Particularly preferred are sodium percarbonate and sodium perborate and, especially, sodium perborate monohydrate. Sodium perborate monohydrate is preferred to tetrahydrate because of its excellent storage stability while also dissolving very quickly in aqueous bleaching solutions.

Peroxyacid compounds include the organic peroxyacids and their salts and the inorganic peroxyacid salts.

Suitable organic peroxyacids can be represented by compounds of the general formula:

$$HO-O-\overset{\overset{O}{\|}}{C}-(O)_n-R-Y,$$

wherein R is an alkylene or substituted alkylene group containing 1 to 20 carbon atoms or an arylene group containing from 6 to 8 carbon atoms, n is 0 or 1, and Y is hydrogen, halogen, alkyl, aryl or any group which provides an anionic or cationic moiety in aqueous solution. Such groups can include, for example.

$$-\overset{\overset{O}{\|}}{C}-OM;\quad -\overset{\overset{O}{\|}}{C}-O-OM;\quad -\underset{\underset{O}{\|}}{\overset{\overset{O}{\|}}{S}}-OM \text{ and } -N^+R_3$$

wherein M is H or a water-soluble, salt-forming cation.

The organic peroxyacids and salts thereof can contain either one, two or more peroxy groups and can be either aliphatic or aromatic. When the organic peroxyacid is aliphatic, the unsubstituted acid may have the general formula:

$$HO-O-\overset{\overset{O}{\|}}{C}-(O)_n-(CH_2)_m-Y$$

wherein Y can be H, $$-CH_3,\ -CH_2Cl,\ -\overset{\overset{O}{\|}}{C}-O-M,\ -\overset{\overset{O}{\|}}{C}-O-OM,$$

$$-\underset{\underset{O}{\|}}{\overset{\overset{O}{\|}}{S}}-OM \text{ or } -N^+R_3$$

and m can be an integer from 1 to 20.

Specific examples of compounds of this type are diperoxyazelaic acid, peroxylauric acid and diperoxydodecanedioic acid, and the magnesium salts thereof.

When the organic peroxyacid is aromatic, the unsubstituted acid may have the general formula:

$$HO-O-\overset{\overset{O}{\|}}{C}-(O)_n-C_6H_4-Y$$

wherein Y is, for example, hydrogen, halogen, alkyl, $$-\overset{\overset{O}{\|}}{C}-OM,\ -\overset{\overset{O}{\|}}{C}-O-OM,\ -\underset{\underset{O}{\|}}{\overset{\overset{O}{\|}}{S}}-OM,$$

$$-(CH_2)_nN^+R_3 \text{ or } -\underset{\underset{O}{\|}}{\overset{\overset{O}{\|}}{S}}-C_6H_4-CO_3M.$$

The percarboxy or percarbonic and Y groupings can be in any relative position around the aromatic ring. The ring and/or Y group (if alkyl) can contain any non-interfering substituents, such as halogen or sulphonate groups.

Specific examples of such aromatic peroxyacids and salts thereof include peroxybenzoic acid, m-chloroperoxybenzoic acid, p-nitro-peroxybenzoic acid, p-sulphonato-peroxybenzoic acid, diperoxyisophthalic acid, peroxy-alpha-naphthoic acid, and 4,4'-sulphonyl-diperoxybenzoic acid and magnesium salts thereof.

A specific example of inorganic peroxyacid salts is potassium monopersulphate. A product comprising this compound is the triple salt, $K_2SO_4.KHSO_4.2KHSO_5$, available commercially under the trade-name Oxone ® from E. I. Dupont de Nemours and Company and Caroat ® from Degussa.

Peroxyacid bleach precursors are known and amply described in literature, such as in the GB-Patents 836,988; 864,798; 907,356; 1,003,310 and 1,519,351; German Patent 3,337,921; EP-A-0185522; EP-A-0174132; EP-A-0120591; and U.S. Pat. Nos. 1,246,339; 3,332,882; 4,128,494; 4,412,934 and 4,675,393.

Another useful class of peroxyacid bleach precursors is that of the quaternary ammonium substituted peroxyacid precursors as disclosed in U.S. Pat. Nos. 4,751,015 and 4,397,757, in EP-A-284292 and in our pending unpublished European Patent Application 89200385.6. Examples of peroxyacid bleach precursors of this class are:

2-(N,N,N-trimethyl ammonium) ethyl sodium-4-sulphophenyl carbonate chloride—(SPCC);

N-octyl,N,N-dimethyl-N10-carbophenoxy decyl ammonium chloride—(ODC);

3-(N,N,N-trimethyl ammonium) propyl sodium-4-sulphophenyl carboxylate; and

N,N,N-trimethyl ammonium toluyloxy benzene sulphonate.

Of the above classes of bleach precursors, the preferred classes are the esters, including acyl phenol sulphonates and acyl alkyl phenol sulphonates; amides, including TAED; and the quaternary ammonium substituted peroxyacid precursors.

Highly preferred activators include sodium-4-benzoyloxy benzene sulphonate; N,N,N',N'-tetraacetyl ethylene diamine; sodium-1-methyl-2-benzoyloxy benzene-4-sulphonate; sodium-4-methyl-3-benzoyloxy benzoate; SPCC and trimethyl ammonium toluyloxy benzene sulphonate.

The detergent bleach composition can be formulated by combining effective amounts of the components. The term "effective amounts" as used herein means that the ingredients are present in quantities such that each of them is operative for its intended purpose when the resulting mixture is combined with water to form an aqueous medium which can be used to wash clothes, fabrics and other articles.

In particular, the detergent bleach composition can be formulated to contain, for example, about 5% to 30% by weight, preferably from 10 to 25% by weight, of a peroxide compound. Peroxyacids may be utilized in somewhat lower amounts, for example from 1% to about 15% by weight, preferably from 2% to 10% by weight.

Peroxyacid precursors may be utilized in combination with a peroxide compound in approximately the same level as peroxyacids, i.e. 1% to 15%, preferably from 2% to 10% by weight.

The transition metal complex catalyst will be present in such formulations in amounts so as to provide the required level of transition metal in the wash liquor. Normally, an amount of transition metal complex catalyst is incorporated in the formulation which corresponds to a transition metal content of from 0.0002% to about 10.0% by weight, preferably 0.002% to 1.0% by weight.

The bleach catalyst of the invention is compatible with substantially any known and common surface-active agents and detergency builder materials.

The surface-active material may be naturally derived, such as soap, or a synthetic material selected from anionic, nonionic, amphoteric, zwitterionic, cationic actives and mixtures thereof. Many suitable actives are commercially available and are fully described in literature, for example in "Surface Active Agents and Detergents", Volumes I and II, by Schwartz, Perry and Berch. The total level of the surface-active material may range up to 50% by weight, preferably being from about 1% to 40% by weight of the composition, most preferably 4 to 25%.

Synthetic anionic surface-actives are usually water-soluble alkali metal salts of organic sulphates and sulphonates having alkyl radicals containing from about 8 to about 22 carbon atoms, the term alkyl being used to include the alkyl portion of higher aryl radicals.

Examples of suitable synthetic anionic detergent compounds are sodium and ammonium alkyl sulphates, especially those obtained by sulphating higher ($C_8$–$C_{18}$) alcohols produced, for example, from tallow or coconut oil; sodium and ammonium alkyl ($C_9$–$C_{20}$) benzene sulphonates, particularly sodium linear secondary alkyl ($Cl_{10}$–$Cl_{15}$) benzene sulphonates; sodium alkyl glyceryl ether sulphates, especially those esters of the higher alcohols derived from tallow or coconut oil and synthetic alcohols derived from petroleum; sodium coconut oil fatty acid monoglyceride sulphates and sulphonates; sodium and ammonium salts of sulphuric acid esters of higher ($C_9$–$C_{18}$) fatty alcohol alkylene oxide, particularly ethylene oxide, reaction products; the reaction products of fatty acids such as coconut fatty acids esterified with isethionic acid and neutralized with sodium hydroxide; sodium and ammonium salts of fatty acid amides of methyl taurine; alkane monosulphonates such as those derived by reacting alphaolefins ($C_8$–$C_{20}$) with sodium bisulphite and those derived by reacting paraffins with $SO_2$ and $Cl_2$ and then hydrolyzing with a base to produce a random sulphonate; sodium and ammonium $C_7$–$C_{12}$ dialkyl sulfosuccinates; and olefin sulphonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkylbenzene sulphonates, sodium ($C_{16}$–$C_{18}$) alkyl sulphates and sodium ($C_{16}$–$C_{18}$) alkyl ether sulphates.

Examples of suitable nonionic surface-active compounds which may be used, include in particular the reaction products of alkylene oxides, usually ethylene oxide, with alkyl ($C_6$–$C_{22}$) phenols, generally 5–25 EO, i.e. 5–25 units of ethylene oxides per molecule; the condensation products of aliphatic ($C_8$–$C_{18}$) primary or secondary linear or branched alcohols with ethylene oxide, generally 6–30 EO, and products made by condensation of ethylene oxide with the reaction products of propylene oxide and ethylene diamine. Other so-called nonionic surface-actives include alkyl polyglycosides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

As stated above, soaps may also be incorporated in the compositions of the invention, preferably at a level of less than 40% by weight. They are particularly useful at low levels in binary (soap/anionic) or ternary mixtures together with nonionic or mixed synthetic anionic and nonionic compounds. Soaps which are used are preferably the sodium, or, less desirably, potassium salts of saturated or unsaturated $C_{10}$–$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about 10%, are used to give a beneficial effect on detergency. This is particularly valuable in compositions used in hard water when the soap acts as a supplementary builder.

The detergent compositions of the invention will normally also contain a detergency builder. Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate; nitrilotriacetic acid and its water-soluble salts; the akali metal salts of carboxymethyloxy succinic acid, ethylene diamine tetraacetic acid, oxydisuccinic acid, mellitic acid, benzene polycarboxylic acids, citric acid; and polyacetal carboxylates as disclosed in U.S. Pat. Nos. 4,144,226 and 4,146,495.

Examples of precipitating builder materials include sodium orthophosphate, sodium carbonate, sodium carbonate/calcite and long chain fatty acid soaps.

Examples of calcium ion-exchange builder materials include the various types of water-insoluble crystalline or amorphous aluminosilicates, of which zeolites are the best known representatives.

In particular, the compositions of the invention may contain any one of the organic or inorganic builder materials, such as sodium or potassium tripolyphosphate, sodium or potassium pyrophosphate, sodium or potassium orthophosphate, sodium carbonate or sodium carbonate/ calcite mixtures, the sodium salt of nitrilotriacetic acid, sodium citrate, carboxymethyl malonate, carboxymethyloxy succinate and the water-insoluble crystalline or amorphous aluminosilicate builder materials, or mixtures thereof.

These builder materials may be present at a level of, for example, from 5 to 80% by weight, preferably from 10 to 60% by weight.

Apart from the components already mentioned, the detergent compositions of the invention can contain any of the conventional additives in the amounts in which such materials are normally employed in fabric washing detergent compositions. Examples of these additives include lather boosters, such as alkanolamides, particularly the monoethanol amides derived from palmkernel fatty acids and coconut fatty acids, lather depressants, such as alkyl phosphates and silicones, anti-redeposition agents, such as sodium carboxymethyl cellulose and alkyl or substituted alkyl cellulose ethers, other stabilizers, such as ethylene diamine tetraacetic acid and the phosphonic acid derivatives (i.e. Dequest® types), fabric softening agents, inorganic salts, such as sodium sulphate, and, usually present in very small amounts, fluorescent agents, perfumes, enzymes, such as proteases, cellulases, lipases and amylases, germicides and colourants.

Another optional but highly desirable additive ingredient with multi-functional characteristics in detergent compositions is from 0.1% to about 3% by weight of a polymeric material having a molecular weight of from 1,000 to 2,000,000 and which can be a homo- or copolymer of acrylic acid, maleic acid, or salt or anhydride thereof, vinyl pyrrolidone, methyl- or ethylvinyl ethers, and other polymerizable vinyl monomers. Preferred examples of such polymeric materials are polyacrylic acid or polyacrylate; polymaleic acid/acrylic acid copolymer; 70:30 acrylic acid/hydroxyethyl maleate copolymer; 1:1 styrene/maleic acid copolymer; isobutylene/maleic acid and diisobutylene/maleic acid copolymers; methyl- and ethyl-vinylether/maleic acid copolymers; ethylene/maleic acid copolymer; polyvinyl pyrrolidone; and vinyl pyrrolidone/maleic acid copolymer.

Detergent bleach compositions of the invention formulated as free-flowing particles, e.g. in powdered or granulated form, can be produced by any of the conventional techniques employed in the manufacture of detergent compositions, but preferably by slurry-making and spray-drying processes to form a detergent base powder to which the heat-sensitive ingredients including the peroxy compound bleach and optionally some other ingredients as desired, and the bleach catalyst, can be added as dry substances. Alternatively, the bleach catalyst can be added separately to a wash/bleach water containing the peroxy compound bleaching agent.

The instant bleach catalyst can also be formulated in detergent bleach compositions of other product forms, such as flakes, tablets, bars and liquids, particularly non-aqueous liquid detergent compositions.

Such non-aqueous liquid detergent compositions in which the instant bleach catalyst can be incorporated are known in the art and various formulations have been proposed, e.g. in U.S. Pat. Nos. 2,864,770; 3,368,977; 4,772,412; GB Patents 1,205,711; 1,370,377; 2,194,536; DE-A-2,233,771 and EP-A-0,028,849.

The heavy metal compounds usable as new bleach catalysts of the invention may be prepared and synthesized in the manners as described in literature for several metal complexes illustrated hereunder:

(i) Preparation of $Co(BPA)Cl_2$

Anhydrous cobalt (II) chloride is prepared by heating the 6-hydrate at 120° C. for several hours. A solution consisting of 7.5 g of the anhydrous cobalt (II) chloride (0.058 mol) dissolved in 300 ml of reagentquality acetone is filtered to remove any undissolved material. To the filtrate is added, with vigorous stirring, a solution containing 10.0 g of di-2-pyridylamine (0.058 mol) dissolved in 50 ml of reagentquality acetone. A blue precipitate, consisting of small, needle-shaped crystals, is formed immediately. It is freed from the mother liquor by filtration (without suction) and is washed with four successive 50 ml portions of acetone. The product is dried for 12 hours at 110° C. The yield is 15.7 g (90%). J. C. Bailar and S. Kirschner, "Inorganic Synthesis", (1957), Vol. 5, page 184.

(ii) Preparation of $Co(BPA)_2(SCN)_2$ and $Co(BPA)_3(ClO_4)_2$

Di(isothiocyanato)bispyridylamine-cobalt (II) was readily prepared by mixing the components in absolute ethanol, as a pale pink precipitate. This was filtered off, washed with ethanol, and dried in vacuo.

Trisdipyridylamine-cobalt (II) perchlorate—A solution of cobalt perchlorate (1.8 g; 0.005 mol) in ethanol (20 ml) was added to one of the ligands (5.1 g; 0.03 mol) also in ethanol. The yellow precipitate was filtered off and washed with ethanol. The compound was dried in vacuo.

M. Goodgame; Journ. of Chem. Soc. (A), 1966, page 63.

(iii) Preparation of $Co(BPA)_2O_2ClO_4$

Orange $Co(BPA)_3(ClO_4)_2$—3.00 g; 0.00389 mol—was oxidized by mixing with $H_2O_2$ (30%, 20 ml), resulting in a red solution. The mixture was heated at 60° C. for 30 min., and then $NaClO_4.H_2O$ (2.00 g; 0.014 mol) was added. On cooling, 2,2'-bipyridylamine and $Co(BPA)_2O_2ClO_4$ cocrystallized. The mass of crystals was collected on a medium-porosity glass filter and was washed with 100 ml of distilled water in 20 ml portions. The mixture was flushed into a 250 ml Erlenmeyer flask with 100 ml of absolute ethanol and allowed to stand for 30 min. with stirring. After this extraction procedure, the dark red crystals were collected on a medium-porosity glass filter, washed with 60 ml of absolute ethanol, and allowed to air-dry. The yield of the diamagnetic ($\mu$eff=0) salt was 1.57 g (75.9%).

W. L. Johnson & J. F. Geldard, Inorganic Chemistry, (1978), Vol. 17, No. 6, page 1675.

(iv) Preparation of $Cu(BPA)_2(ClO_4)_2$

Bis-(2,2'-bipyridylamine)copper(II)perchlorate was prepared by adding to $Cu(CLO_4)_2.6\ H_2O$ (0.013 moles) in absolute ethanol (12 ml), a solution of 0.027 moles $2,2^1$-bipyridylamine in acetone (175 ml). The deep blue microcrystals which precipitated immediately were then recrystallized from hot water. On slow cooling, very small blue plate-like crystals and larger rod-like crystals were formed.

J. E. Johnson et al "J. Chem. Soc. A." (1971), page 1371.

(v) Preparation of $Fe(BPA)_3\ (CLO_4)_2$

Tris(di-2-pyridylamine) iron(II)perchlorate-All preparations were carried out under nitrogen and all solvents carefully dried. Iron(II)perchlorate (0.6 g) in absolute ethanol (5 ml) was mixed with a solution of di-2-pyridylamine (1.2 g) in ethanol (20 ml). The solution was heated under reflux for 10 minutes, then cooled. Plae greenish-yellow crystals of the complex were 30 filtered off and washed with light petroleum (b.p. 60°-80° C.)—The yield was 1.2 g.

W. R. Mc.Whinnie et al, "J. Chem. Soc. (A)", 1967, page 1671.

The invention will now be further illustrated by way of the following Examples.

EXAMPLES I-IX

The experiments were either carried out in a temperature-controlled glass beaker equipped with a magnetic stirrer, thermocouple and a pH-electrode, or under real washing machine conditions.

Glass vessel experimental conditions

All experiments were carried out at 40° C. The suds were heated up from 20° to 40° C. in 13 min. and then maintained for another 37 min., simulating a 50 min. 40° C. wash.

In all experiments, hardened-up tapwater (16° FH) was applied. A Ca/Mg stock solution Ca:Mg=4:1 (weight ratio) was used to adjust water hardness to either 27° FH in experiments with STP and zeolite/polymer formulations or 36° FH in experiments with carbonate/calcite formulations. (STP=sodium triphosphate).

The dosages amounted to 6 g/l total formulation. The composition of the base powders used is described below.

The amount of sodium perborate monohydrate was 15% (calculated on 6 g/l dosage), yielding 9 mmol/l $H_2O_2$.

In most cases the catalysts were dosed at a concentration of 0.5 mg/l of metal. The amount of $Co(BPA)Cl_2$ required was 2.55 mg/l; of $Co(BPA)_2(SCN)_2$ 4.38 mg/l; of $Co(BPA)_3(ClO_4)_2$ 6.47 mg/l.

In all experiments the initial pH at 20° C. was set at 10.5. In the 40° C. experiments the final pH was 9.9.

Tea-stained cotton test cloth was used as bleach monitor. In some cases a polyester cotton tea-stained test cloth was used as an additional bleach monitor. tumble drier. The reflectance ($R_{460^*}$) was measured before and after washing on a Zeiss Elrephometer. The average was taken of 4 values/test cloth.

Washing machine experiments

The washing powder (base formulation+sodium perborate monohydrate) was carefully dosed into an AEG Turnette ® to avoid mechanical loss. After water intake, the catalyst was added to the suds as a freshly prepared solution in 10 ml demi-water. The conditions were:

| | |
|---|---|
| Programme | 40° C. main wash only |
| Dosage | 6 g/l; of which 4.5 g base STP I + 1.2 g perb.m.h. (~20%) + 0.5 mg/l Co as $Co(BPA)Cl_2$ |
| Water | 20 l tapwater: 16° FH |
| Temperature-time profile | 20° C. 40° C. in 12 min., 38 min. at 40° C. |
| pH | 10.5 at 20° C.; 10.0 at 40° C. |
| Load | 3.5 kg soiled or clean cotton load |

All other experimental conditions were as described above for the experiments in glass vessels.

Formulations of fabric washing powders used

| Composition | STP I | STP II | Zeo | C/C |
|---|---|---|---|---|
| Alkylbenzene sulphonate | 9.5 | 6.5 | 8.9 | 11.1 |
| Nonionic | 4.0 | 3.0 | 4.0 | 4.1 |
| Soap | | 5.0 | | |
| Sodium tripolyphosphate | 29.9 | 33.0 | | |
| $Na_2CO_3$ | | | 6.0 | 30.3 |
| $CaCO_3$ (calcite) | | | | 20.2 |
| Zeolite 4A | | | 30.0 | |
| Polycarboxylate | | | 3.0 | |
| Alk. silicate | 6.0 | 8.0 | 5.0 | 7.0 |
| Sucrose | | | | 4.1 |
| $Na_2SO_4$ | 24.5 | 16.0 | 18.5 | |
| Minors | 0.9 | 1.3 | 1.9 | 1.2 |
| $NaBO_3.H_2O$ | 15.0 | 15.0 | 15.0 | 15.0 |
| Water | 10.2 | 12.2 | 7.7 | 7.0 |

EXAMPLE I

In this example the bleach performance of $Co(BPA)Cl_2$ and $Co(BPA)_3(ClO_4)_2$ is compared with that of other catalyst known in the art.

Conditions: "STP I" base formulation; catalyst concentration 0.5 ppm as pure Co; 5 ppm pure Mn in case of Mn-EDTA.

| Results: catalysts | $\Delta R_{460}$* value |
|---|---|
| none | 5.1 |
| Mn-EDTA | 10.6 |
| $Co(BPY)*_3(NO_3)_2$ | 7.1 |
| $Co(BPA)Cl_2$ | 16.1 |
| $Co(BPA)_2(SCN)_2$ | 15.8 |
| $Co(BPA)_3(ClO_4)_2$ | 13.4 |

*BPY = 2,2'-bipyridine

Conclusion

The results clearly demonstrate the superior performance of the Co-BPA catalysts over the other catalysts and over the system without catalyst.

EXAMPLE II

In this example the bleach performance of $Co(BPA)Cl_2$ and $Co(BPA)_3(ClO_4)_2$ is compared with that of Mn-gluconate.

Conditions: "Zeo" formulation; all catalysts at 0.5 ppm metal

| Results: catalysts | $\Delta R_{460}$* value |
|---|---|
| Mn-gluconate | 18.0 |
| $Co(BPA)Cl_2$ | 21.4 |
| $Co(BPA)_3(ClO_4)_2$ | 21.1 |

Conclusion

The results clearly demonstrate the better performance of the Co-BPA catalysts.

EXAMPLE III

In this example the bleach performance of $Co(BPA)Cl_2$ and $Co(BPA)_3(ClO_4)_2$ is given in different base powder formulations.

| | Results: $\Delta R_{460}$ values for | | |
|---|---|---|---|
| catalyst | none | $Co(BPA)Cl_2$ | $Co(BPA)_3(ClO_4)_2$ |
| base | | | |
| STP I | 5.1 | 16.1 | 13.4 |
| STP II | 6.8 | 14.7 | 12.9 |
| Zeo | 9.5 | 21.4 | 21.1 |
| C/C | 9.4 | 22.4 | 20.7 |

Conclusion

The results demonstrate the bleach enhancement of the catalysts which is present in all four formulations with different builder systems and different active systems (compare STP I and STP II).

EXAMPLE IV

This example shows the effect of catalyst concentration upon bleach performance.

Conditions: "C/C" formulation; 40° C. experiments in 36° FH water

Catalyst: $Co(BPA)cl_2$.

| Results: catalyst concentration | $\Delta R_{460}$* value |
|---|---|
| mg/l Co | |
| 0 | 8.8 |
| 0.05 | 14.7 |
| 0.25 | 20.5 |
| 0.50 | 22.4 |

Conclusion

The results show the strong catalytic effect already at very low concentrations.

EXAMPLE V

This example shows the bleach performance in a real machine wash experiment with either a clean or a normally soiled wash load.

| | Results: | | |
|---|---|---|---|
| catalyst: | none | $Co(BPA)Cl_2$ | $Co(BPA)Cl_2$ |
| load | clean | clean | soiled |
| $\Delta R_{460}$ value | 5.2 | 16.3 | 12.8 |

Conclusion

Although a slight reduction in bleach performance is observed in the soiled load wash, the results demonstrate the catalytic effect in real machine washes.

EXAMPLE VI

This example shows the bleach performance on a different stain: spaghetti sauce on cotton. This stain has a very hydrophobic character as compared to the tea stain in Examples I-V. These experiments have been done under the following washing conditions.

Conditions: 15 min washes at 40° C. in a tergotometer using 12° FH water (2Ca:lMg). Base powder (STP) was used at 1.5 g/l; perborate monohydrate at 0.4 g/l (the system gives a pH of 9.8). The stains were washed twice in this system.

| | Results: | |
|---|---|---|
| catalyst | ($\Delta$B) reflectance after 1st wash | ($\Delta$B) reflectance after 2nd wash |
| None | 3.7 | 6.6 |
| $Cu(BPA)_2^{2+}$ | 15.6 | 27.1 |
| $Cu(BPY)_2^{2+}$ | 5.0 | 8.8 |
| $Co(BPA)_3^{2+}$ | 8.2 | 24.2 |
| $Co(BPY)_3^{2+}$ | 4.7 | 7.0 |
| $Fe(BPA)_3^{3+}$ | 11.0 | 25.3 |
| $Fe(BPY)_3^{3+}$ | 4.6 | 7.5 |
| $Mn(BPA)_3^{2+}$ | 10.4 | 24.8 |
| $Mn(BPY)_3^{2+}$ | 5.8 | 8.6 |
| $Cu(BPA)Cl_2$ | 16.0 | 24.8 |
| $Co(BPA)Cl_2$ | 7.9 | 23.6 |
| $Co(BPA)_2O_2^{+}$ | 6.8 | 23.9 |

Conclusion

The results clearly show the large bleach enhancement with all the BPA complexes with each of the metals used. The 2,2'-bipyridine complexes which are known in the art give a much poorer performance.

EXAMPLE VII

This example examines the effect of pH on the bleach performance in similar experiments as described in Example VI: Effects are expressed in $\Delta$ reflectance ($\Delta$B) after second wash.

Conditions: the same as in Example VI except that the pH was adjusted to the desired value.

| | | Results: | |
|---|---|---|---|
| pH | None | (ΔB) $Cu(BPA)_2^{2+}$ | (ΔB) $Fe(BPA)_3^{3+}$ |
| 8 | 5.1 | 7.1 | 4.2 |
| 8.5 | — | 25.3 | 9.3 |
| 9 | 7.2 | 22.7 | 12.5 |
| 9.5 | — | 23.2 | 17.8 |
| 10 | 6.6 | 13.7 | 22.6 |
| 10.5 | — | 7.6 | 19.9 |

Conclusion

The results clearly show the good bleach performance over a wise pH range covering that normally applied in washing of fabrics.

EXAMPLE VIII

This example demonstrates bleach activity of a Co-BPA system and that of a Co-bispyridylmethane (BPM) system.

Conditions: 40° C. experiment in glass beaker; no base powder present.

Concentration $H_2O_2$ is $8.6*10^{-3}$ Mol/l.

Concentration Co is $1.0*10^{-5}$ Mol/l.

| | Results: $\Delta R_{460}$ tea stain on: | |
|---|---|---|
| Co/ligand ratio | cotton | polyester cotton |
| None | 7.6 | 5.2 |
| Co/BPA 1:3 | 26.8 | 20.0 |
| Co/BPM 1:6 | 18.2 | 11.9 |

Conclusion

Both the BPA and BPM systems give good bleaching. The catalytic bleach systems also perform on the tea stain when present on polyester cotton instead of pure cotton.

EXAMPLE IX

This example shows that catalysis of bleaching by potassium monopersulphate is also possible.

Conditions: as in Example I with Zeo base powder (see Example III) and with 13% Caroat® giving 2.5 $10^{-3}$ Mol/l monopersulphate and 0.5 ppm Co as $Co(BPA)Cl_2$ or $Co(BPA)_3(ClO_4)_2$.

| Results: catalyst | $\Delta R_{460}$ |
|---|---|
| None | 17.6 |
| $Co(BPA)Cl_2$ | 25.2 |
| $Co(BPA)_3(ClO_4)_2$ | 26.6 |

Conclusion

The results clearly show the enhanced bleaching in the systems with a catalyst.

We claim:

1. Process for the bleaching and cleaning of substrates employing a bleaching agent selected from the group of peroxy compound bleaches consisting of hydrogen peroxide, hydrogen peroxide-liberating compounds, peroxyacids and their salts, and peroxyacid bleach precursors and mixtures thereof, characterized in that said bleaching agent is activated by a catalytic amount of a transition metal complex of the following general formula:

$$[M_n(L)_mX_p]^1Y_z \quad (I)$$

wherein M is a metal ion selected from the group consisting of Mn, Fe, Co, and Du; X is selected from the group consisting of $Cl^-$, $Br^-$, $I^-$, $NO_3^-$, $CLO_4^-$, $NCS^-$, $OH^-$, $O_2^{2-}$, $O_2^-$, $HO_2^-$, $H_2O_2$, $H_2O$, $NH_3$, and pyridine;

n represents an integer from 1 to 2;

m is an integer from 1-5;

p is an integer from 0-8;

Y is a counter ion, the type of which is independent upon the charge z of the complex;

z denotes the charge of the complex and is an integer which can be positive or negative, whereby, if z is positive, Y is a common anion as denoted for X and, if z is negative, Y is a common cation selected from the group consisting of alkali metal, alkaline earth metal and an alkyl ammonium cation; and L is a ligand selected from the group consisting of 2,2-bispyridylamine and 2,2-bispyridylmethane.

2. Process according to claim 1, characterized in that an aqueous bleaching solution is used wherein the transition metal complex catalyst is present in an amount corresponding to 0.01 to 100 ppm of the transition metal.

3. Process according to claim 2, characterized in that the amount of transition metal is from 0.1 to 10 ppm.

4. A bleaching agent composition comprising a peroxy compound bleach selected from the group consisting of hydrogen peroxide, hydrogen peroxide-liberating compounds, peroxyacids and their salts and peroxyacid bleach precursors and mixtures thereof, and a catalyst for the bleaching action of said peroxy compound bleach, characterized in that said catalyst is a transition metal complex of the following general formula:

$$[M_n(L)_mX_p]^zY_z \quad (I)$$

wherein M is a metal ion selected from the group consisting of Mn, Fe, Co, and Cu; X is selected from the group consisting of $Bl^-$,$Br^-$, $I^-$, $NO_3^-$, $CLO_4^-$, $NCS^-$, $OH^-$, $O_2^{2-}$, $O_2^-$, $HO_x^-$, $H_2O_2$, $H_2O$, $NH_3$, and pyridine;

n represents an integer from 1 to 2;

m is an integer from 1-5;

p is an integer from 0-8;

Y is a counter ion, the type of which is dependent upon the charge z of the complex;

z denotes the charge of the complex and is an integer which can be positive or negative, whereby, if z is positive, Y is a common anion as denoted for X and, if z is negative, Y is a common cation selected from the group consisting of alkali metal, alkaline earth metal and an alkyl ammonium cation; and L is a ligand selected from the group consisting of 2,2-bispyridylamine and 2,2-bispyridylmethane.

5. A composition according to claim 1, characterized in that the transition metal complex catalyst is present in an amount corresponding to a transition metal content of from 0.0002% to 10% by weight.

6. A composition according to claim 5, characterized in that the amount of transition metal is from 0.002% to 1.0% by weight.

7. A composition according to claim 4, characterized in that it further comprises a surface-active material and a detergency builder.

* * * * *